(12) United States Patent
Terada et al.

(10) Patent No.: US 7,221,517 B2
(45) Date of Patent: May 22, 2007

(54) IMAGE FORMING DEVICE

(75) Inventors: Mamoru Terada, Sakai (JP);
Hiromichi Nose, Toyokawa (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 100 days.

(21) Appl. No.: 11/187,465

(22) Filed: Jul. 22, 2005

(65) Prior Publication Data

US 2006/0023319 A1 Feb. 2, 2006

(30) Foreign Application Priority Data

Jul. 27, 2004 (JP) ............................. 2004-218422

(51) Int. Cl.
G02B 15/14 (2006.01)
H04N 5/262 (2006.01)

(52) U.S. Cl. .................... 359/682; 359/680; 348/240.3

(58) Field of Classification Search ................ 359/680, 359/682; 348/240.3
See application file for complete search history.

(56) References Cited

U.S. PATENT DOCUMENTS 6,038,084 A * 3/2000 Okada et al. ............... 359/689

7,139,129 B2 * 11/2006 Nose et al. .................. 359/682
2003/0138245 A1 7/2003 Watanabe ..................... 396/72

FOREIGN PATENT DOCUMENTS

JP 2002-323654 A 11/2002
JP 2003-131132 A 5/2003

* cited by examiner

Primary Examiner—David N. Spector
(74) Attorney, Agent, or Firm—Sidley Austin LLP

(57) ABSTRACT

An image forming device is provided with: a zoom lens system TL that performs magnification varying by changing the distance between the lens units; and an image sensor SR that converts an optical image formed by the zoom lens system TL into an electric signal. The zoom lens system TL includes at least a negative first lens unit GR1 and a positive second lens unit GR2, and at least the first lens unit GR1 and the second lens unit GR2 move in zooming from the wide angle end (W) to the telephoto end (T). The second lens unit GR2 includes three lens elements of, from the object side, a positive meniscus lens element L21 convex to the object side, a negative lens element L22 and a positive lens element L23, and the following condition is satisfied:

$$-1.0 < (CR1-CR2)/(CR1+CR2) < 0.0$$

(CR1 is the front radius of curvature of the most object side lens element L21 in the second lens unit GR2, and CR2 is the rear radius of curvature of the most object side lens element L21 in the second lens unit GR2).

10 Claims, 6 Drawing Sheets

IMAGE FORMING DEVICE

This application is based on application No. 2004-218422 filed in Japan, the content of which is hereby incorporated by reference.

BACKGROUND OF THE INVENTION

1. Field of the Invention

The present invention relates to an image forming device, and more specifically, relates to an image forming device that optically forms an image of the subject by a zoom lens system and outputs it as an electric signal by capturing the image by an image sensor, above all, an image forming device having a high-performance and small-size zoom lens system.

2. Description of the Related Art

In recent years, digital cameras with which images can be easily captured have been becoming widespread with the spread of personal computers. Accordingly, smaller-size digital cameras have been demanded, and it has been demanded that taking lens systems be smaller in size. On the other hand, since the number of pixels of image sensors tends to increase year by year, high optical performance corresponding to the increased number of pixels of the image sensors and ease of manufacture capable of handling the reduction in product cycle are required of taking lens systems. Moreover, since image magnification variation, particularly optical magnification variation with little image degradation is also required of general consumer digital cameras, various types of zoom lens systems have previously been proposed in order to meet the requirements for smaller size and higher performance, and an example thereof is disclosed in U.S. Patent Application Publication No. 2003/0138245.

However, in conventional zoom lens systems like that proposed in the above-mentioned patent application publication, it is difficult to simultaneously satisfy the conflicting requirements for smaller size, higher performance and ease of manufacture.

SUMMARY OF THE INVENTION

The present invention is made in view of such circumstances, and an object thereof is to provide an image forming device having a zoom lens system that is easy to manufacture although being small in size and high in performance.

To attain the above-mentioned object, a first aspect of the present invention is an image forming device provided with: a zoom lens system comprising a plurality of lens units and performing magnification varying by changing the distance between the lens units; and an image sensor that converts an optical image formed by the zoom lens system into an electric signal. The zoom lens system comprises at least a first lens unit having negative optical power and a second lens unit having positive optical power from the object side, and at least the first lens unit and the second lens unit move in zooming from the wide angle end to the telephoto end. The second lens unit includes three lens elements of, from the object side, a positive meniscus lens element convex to the object side, a negative lens element and a positive lens element, and the following condition (1) is satisfied:

$$-1.0 < (CR1-CR2)/(CR1+CR2) < 0.0 \quad (1)$$

where CR1 is the front radius of curvature of the most object side lens element in the second lens unit, and CR2 is the rear radius of curvature of the most object side lens element in the second lens unit.

According to the above-described structure, since the second lens unit satisfies the predetermined condition, the zoom lens system can be reduced in size and increased in precision while high optical performance is maintained by sufficient aberration correction. Consequently, an image forming device can be realized that is provided with a zoom lens system being easy to manufacture although being small in size and high in performance. The use of the image forming device for apparatuses such as digital cameras and portable information apparatuses contributes to a reduced thickness, weight and size, reduced cost, higher performance, higher functionality and the like of the apparatuses.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Hereinafter, embodiments of the image forming device will be described with reference to the drawings. The image forming device is an optical device that optically forms an image of the subject and outputs it as an electric signal, and is a principal component of a camera used for taking still images and moving images of the subject. Examples of such a camera include: digital cameras; video cameras; surveillance cameras; vehicle-mounted cameras; cameras for videophones; cameras for doorphones; and cameras incorporated in or externally attached to personal computers, mobile computers, mobile telephones and PDAs (personal digital assistants), peripherals (mice, scanners, printers, etc.) thereof, other digital apparatuses and the like. As is apparent from these examples, not only a camera can be constructed by using the image forming device but also a camera function can be added by providing various apparatuses with the image forming device. For example, a digital apparatus having an image input function such as a camera phone can be constructed.

While the term "digital camera" conventionally denotes cameras that record only still images, digital still cameras and home digital movie cameras that are capable of handling both still images and moving images have also been proposed and presently, these cameras are not specifically distinguished from each other. Therefore, the term "digital camera" includes all of the cameras such as digital still cameras, digital movie cameras and web cameras (cameras connected to apparatuses that enable image transmission and reception by being connected to a network irrespective of whether it is an open type or a private type; including both of cameras directly connected to the network and cameras connected through an apparatus having an information processing function such as a personal computer) whose principal component is an image forming device including a taking lens system that forms an optical image and an image sensor that converts the optical image into an electric video signal.

Figure 7:
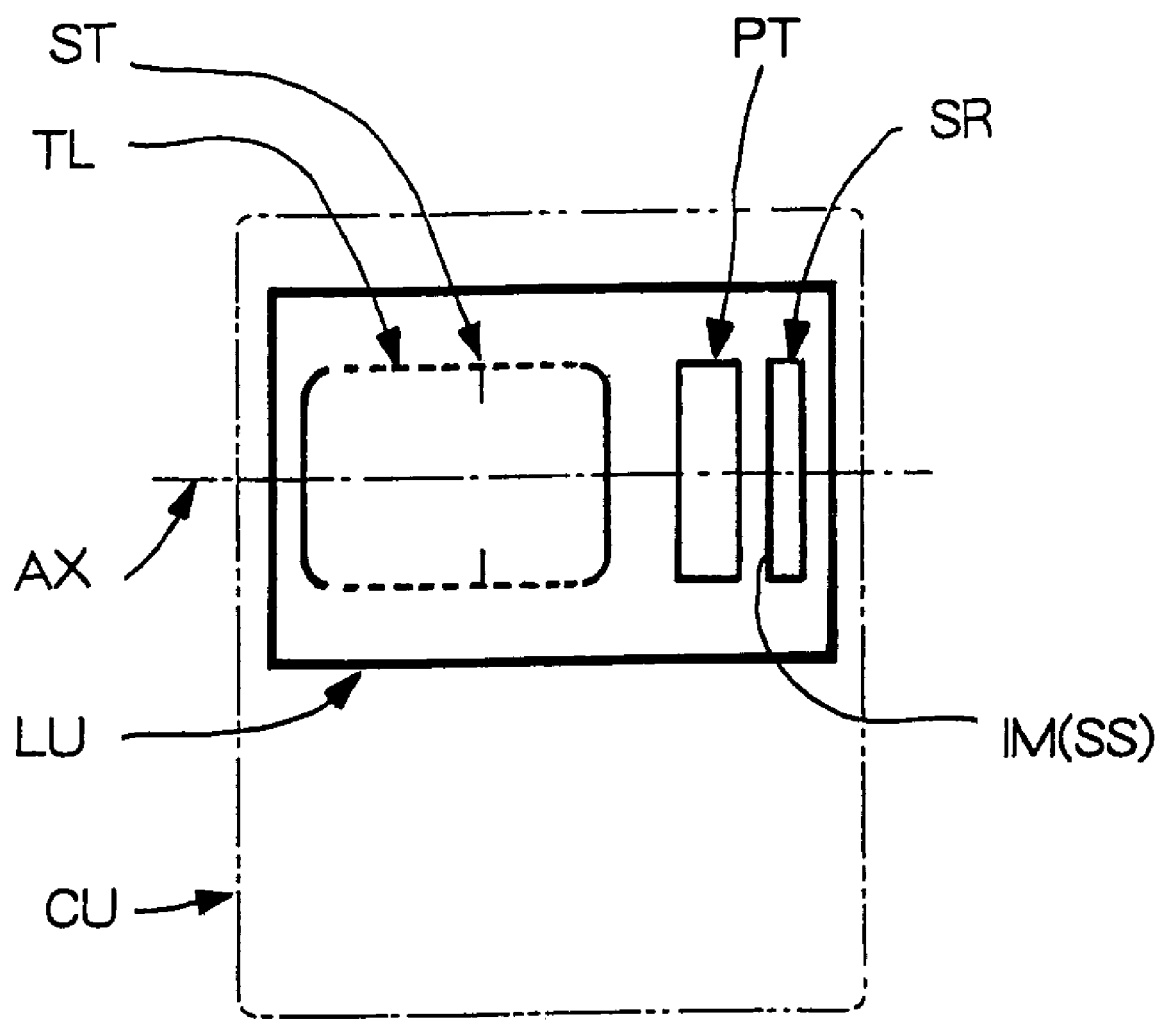
FIG. 7 is a schematic view showing an example of a schematic optical structure of an image forming device.

FIG. 7 shows an example of the structure of the image forming device LU. The image forming device LU comprises from the object (that is, the subject) side: a zoom lens system (corresponding to the taking lens system, ST is a diaphragm) TL that forms an optical image (IM: image surface) of an object so that the magnification is variable; a plane parallel plate PT (an optical filter such as an optical low-pass filter or an infrared cut filter disposed as required; corresponding to a cover glass or the like of an image sensor SR); and the image sensor SR that converts the optical image IM formed on a light receiving surface SS by the zoom lens system TL, into an electric signal. The image forming device LU constitutes a part of a digital apparatus CU corresponding to a digital camera or a portable information apparatus (that is, a compact and portable information apparatus terminal such as a mobile telephone or a PDA). When a digital camera is constructed by use of the image forming device LU, normally, the image forming device LU is disposed within the body of the camera, and when a camera function is realized, a configuration as required may be adopted. For example, a unitized image forming device LU may be formed so as to be detachably attachable or rotatable with respect to the camera body, or a unitized image forming device LU may be formed so as to be detachably attachable or rotatable with respect to a portable information apparatus (a mobile telephone, a PDA, etc.).

The zoom lens system TL comprises a plurality of lens units, and is structured so that a plurality of lens units move along the optical axis AX and magnification varying (that is, zooming) is performed by changing the distance between the lens units. In a first and second embodiments described later, the zoom lens system TL has a three-unit zoom construction of negative, positive, positive configuration, and the three lens units are all movable units. In a third embodiment described later, the zoom lens system TL has a two-unit zoom construction of negative, positive configuration, and the two lens units are both movable units.

As the image sensor SR, for example, a solid-state image sensor such as a CCD (charge coupled device) or a CMOS (complementary metal oxide semiconductor) sensor having a plurality of pixels is used. The optical image formed (on the light receiving surface SS of the image sensor SR) by the zoom lens system TL is converted into an electric signal by the image sensor SR. The signal generated by the image sensor SR undergoes predetermined digital image processing, image compression processing and the like as required and is recorded onto a memory (a semiconductor memory, an optical disk, etc.) as a digital video signal, or in some cases, is transmitted to another apparatus through a cable or by being converted into an infrared signal.

While in the image forming device LU shown in FIG. 7, reduction projection from the subject on the enlargement side onto the image sensor SR on the reduction side is performed by the zoom lens system TL, by using a display device (for example, a liquid crystal display device) that displays a two-dimensional image instead of the image sensor SR and using the zoom lens system TL as the projection lens system, an image projector can be constructed that performs enlargement projection from the image display surface on the reduction side onto the screen surface on the enlargement side. That is, the zoom lens system TL of each embodiment described below is not only usable as a taking lens system but also suitably usable as a projection lens system.

Figure 1:
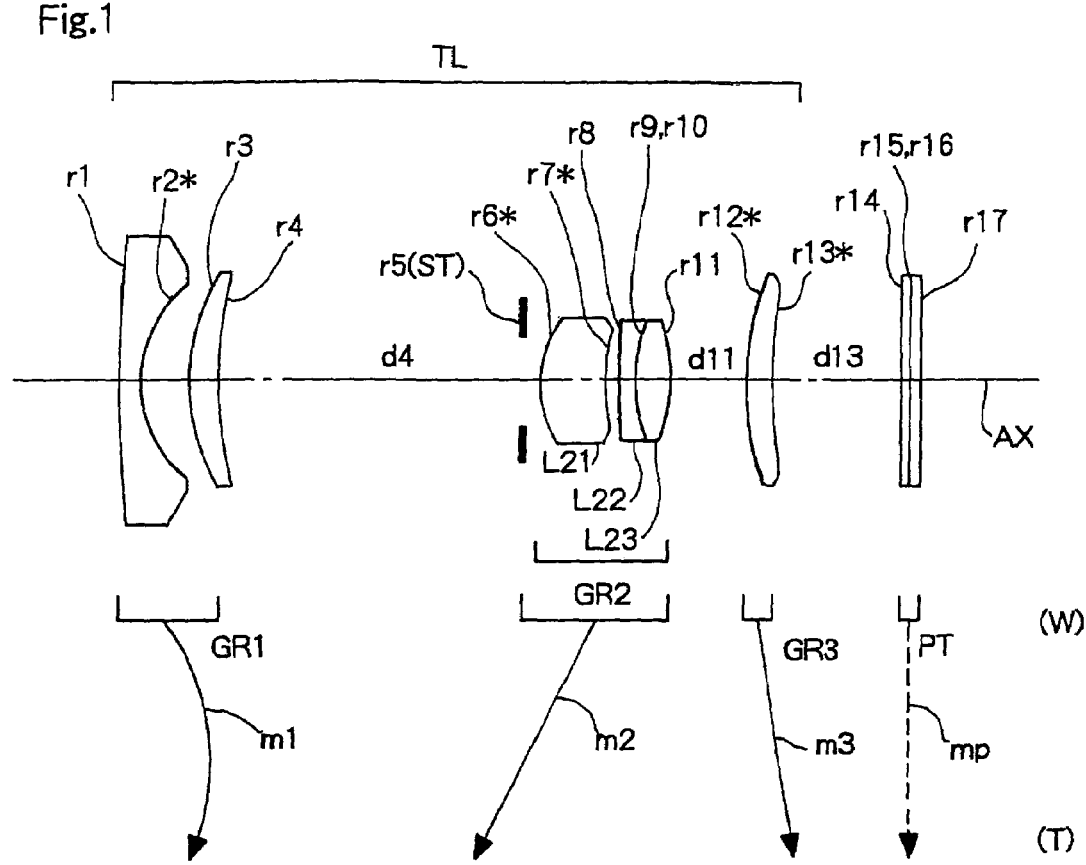
FIG. 1 is a lens construction view of a first embodiment.
Figure 2:
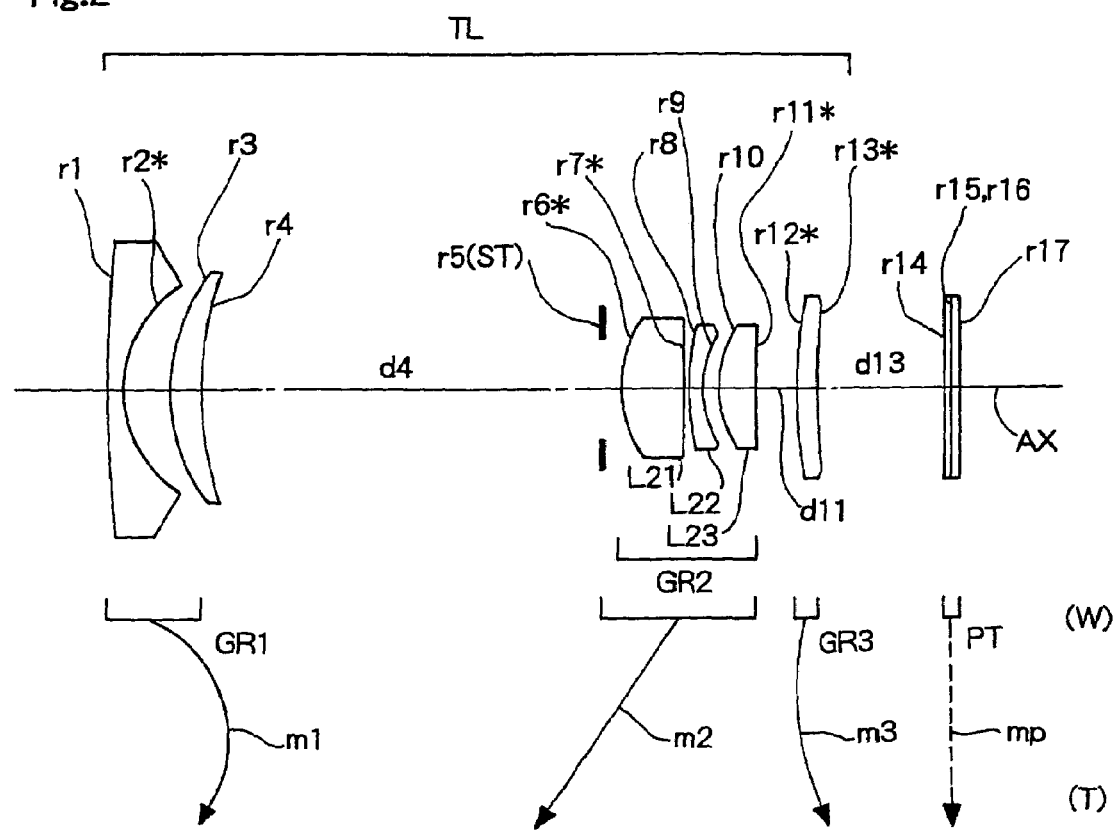
FIG. 2 is a lens construction view of a second embodiment.
Figure 3:
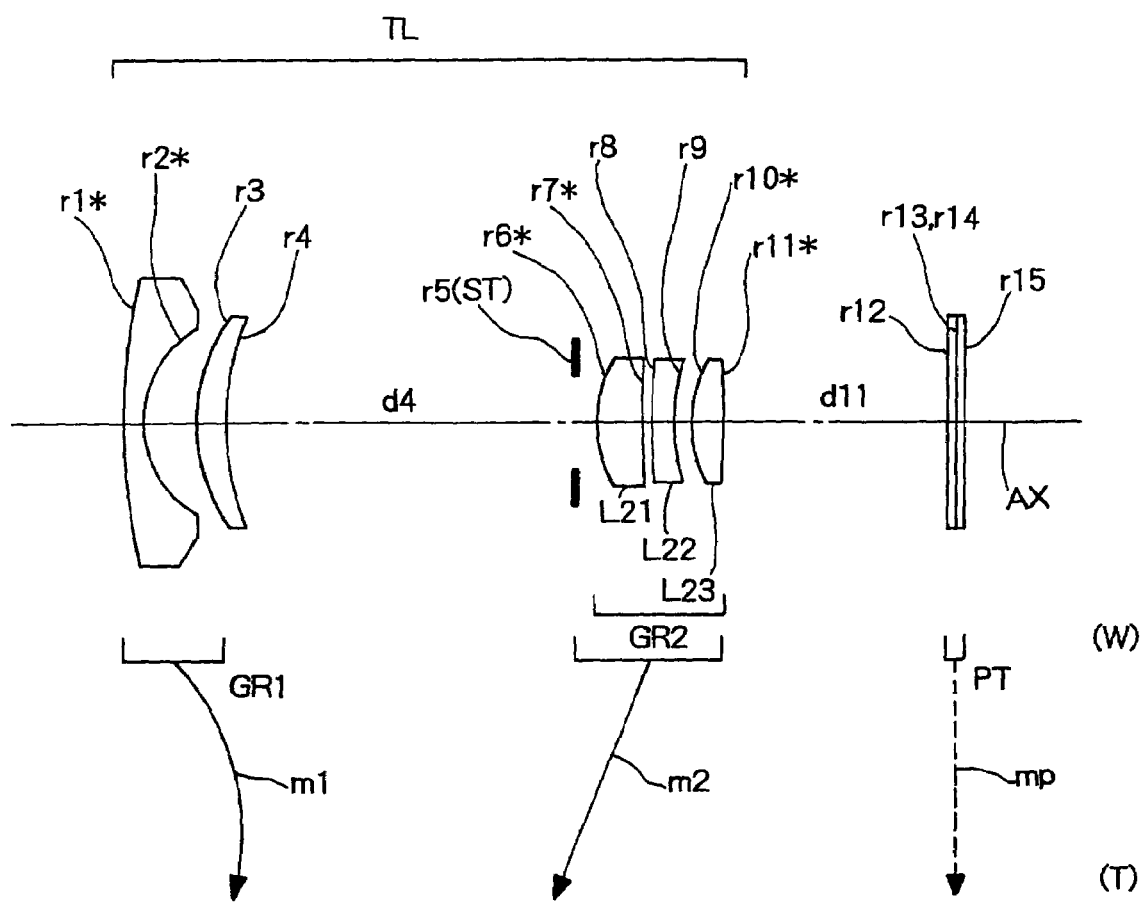
FIG. 3 is a lens construction view of a third embodiment.

FIGS. 1 to 3, which are lens construction views corresponding to the zoom lens systems TL constituting the first to third embodiments, respectively, show the lens arrangement at the wide angle end (W) by a cross section. In the lens construction views, the surfaces designated ri (i=1, 2, 3, . . . ) are the i-th surfaces counted from the object side (surfaces designated ri marked with * are aspherical surfaces), and the axial distances designated di (i=1, 2, 3, . . . ) are, of the i-th axial distances counted from the object side, variable distances that vary in zooming. In the lens construction views, the solid arrows m1, m2 and m3 schematically show the movements of a first lens unit GR1, a second lens unit GR2 and a third lens unit GR3 in zooming from the wide angle end (W) to the telephoto end (T), and the dashed arrow mp shows that the plane parallel plate PT is stationary in zooming. In any of the embodiments, the diaphragm ST is disposed between the first lens unit GR1 and the second lens unit GR2, and the diaphragm ST moves together with the second lens unit GR2 in zooming (the solid arrow m2).

The zoom lens systems TL of the first to third embodiments are zoom lens systems comprising at least two units which zoom lens systems comprise at least the first lens unit GR1 having negative optical power (optical power is an amount defined by the reciprocal of the focal length) and the second lens unit GR2 having positive optical power from the object side and perform zooming by changing the distances between the lens units. The zoom lens systems TL adopt a zoom construction in which at least the first lens unit GR1 and the second lens unit GR2 are movable units, and at least the first lens unit GR1 and the second lens unit GR2 move in zooming from the wide angle end (W) to the telephoto end (T). The lens construction of each embodiment will be described below in detail.

In the first embodiment (FIG. 1), in the three-unit zoom construction of negative, positive, positive configuration, the lens units are constructed as follows: The first lens unit GR1 comprises from the object side: a negative meniscus lens element concave in the image side and whose image side surface is an aspherical surface; and a positive meniscus lens element convex to the object side. The second lens unit GR2 comprises from the object side: a positive meniscus lens element L21 convex to the object side and whose both side surfaces are aspherical surfaces; and a doublet lens having a negative meniscus lens element L22 concave to the image side and a bi-convex positive lens element L23. The diaphragm ST that moves together with the second lens unit GR2 in zooming is disposed on the object side of the second lens unit GR2. The third lens unit GR3 comprises only one positive meniscus lens element convex to the object side and whose both side surfaces are aspherical surfaces. In zooming from the wide angle end (W) to the telephoto end (T), the first lens unit GR1 moves toward the image side and then, makes a U-turn from the image side toward the object side, the second lens unit GR2 monotonously moves toward the object side, and the third lens unit GR3 monotonously moves toward the image side.

In the second embodiment (FIG. 2), in the three-unit zoom construction of negative, positive, positive configuration, the lens units are constructed as follows: The first lens unit GR1 comprises from the object side: a negative meniscus lens element concave in the image side and whose image side surface is an aspherical surface; and a positive meniscus lens element convex to the object side. The second lens unit GR2 comprises from the object side: a positive meniscus lens element L21 convex to the object side and whose both side surfaces are aspherical surfaces; a negative meniscus lens element L22 concave in the image side; and a bi-convex positive lens element L23 whose image side surface is an aspherical surface. The diaphragm ST that moves together with the second lens unit GR2 in zooming is disposed on the object side of the second lens unit GR2. The third lens unit GR3 comprises only one positive meniscus lens element convex to the object side and whose both side surfaces are aspherical surfaces. In zooming from the wide angle end (W) to the telephoto end (T), the first lens unit GR1 moves toward the image side and then, makes a U-turn from the image side toward the object side, the second lens unit GR2 monotonously moves toward the object side, and the third lens unit GR3 moves toward the object side and then, makes a U-turn from the object side toward the image side.

In the third embodiment (FIG. 3), in the two-unit zoom construction of negative, positive configuration, the lens units are constructed as follows: The first lens unit GR1 comprises from the object side: a negative meniscus lens element concave in the image side and whose both side surfaces are aspherical surfaces; and a positive meniscus lens element convex to the object side. The second lens unit GR2 comprises from the object side: a positive meniscus lens element L21 convex to the object side and whose both side surfaces are aspherical surfaces; a negative meniscus lens element L22 concave in the image side; and a bi-convex positive lens element L23 whose both side surfaces are aspherical surfaces. The diaphragm ST that moves together with the second lens unit GR2 in zooming is disposed on the object side of the second lens unit GR2. In zooming from the wide angle end (W) to the telephoto end (T), the first lens unit GR1 moves toward the image side and then, makes a U-turn from the image side toward the object side, and the second lens unit GR2 monotonously moves toward the object side.

As described above, in all of these embodiments, the second lens unit GR2 comprises three lens elements of, from the object side, the positive meniscus lens element L21 convex to the object side, the negative lens element L22 and the positive lens element L23. By forming the second lens unit of three lens elements of, from the object side, a positive meniscus lens element convex to the object side, a negative lens element and a positive lens element like in each embodiment in a zoom lens system including from the object side a first lens unit having negative optical power and a second lens unit having positive optical power as movable units, a compact zoom lens system can be realized in which the number of lens elements is small and the movement mechanism is comparatively simple. Moreover, by forming the second lens unit of three single lens elements of a meniscus lens element convex to the object side, a negative lens element and a positive lens element like the second and third embodiments and forming the second lens unit of a meniscus lens element convex to the object side and a doublet lens having a negative lens element and a positive lens element like the first embodiment, aberration correction can be excellently performed.

When the meniscus lens element convex to the object side constitutes a part of a doublet lens, there is no degree of freedom at the cemented surface, so that it is difficult to achieve both aberration correction (particularly, correction of spherical aberration at the telephoto end) and reduction in error sensitivity.

To reduce the size, enhance the performance and facilitate the manufacture of a zoom lens system in which at least a negative and positive lens units are included from the object side and the first and second lens units are movable units, it is preferable that the second lens unit comprise three lens units of, from the object side, a positive meniscus lens element convex to the object side, a negative lens element and a positive lens element as mentioned above and the following condition (1) be satisfied:

$$1.0 < (CR1-CR2)/(CR1+CR2) < 0.0 \tag{1}$$

where CR1 is the front radius of curvature of the most object side lens element in the second lens unit, and CR2 is the rear radius of curvature of the most object side lens element in the second lens unit.

The condition (1) defines a preferable condition range with respect to a shape factor of the most object side lens element (the positive meniscus lens element L21 convex to the object side in each embodiment) in the second lens unit. When the lower limit of the condition (1) is exceeded, the most object side lens element is a bi-convex lens element, and the error sensitivity of the distance between the most object side lens element and the succeeding lens element increases. To reduce the error sensitivity, it cannot be helped that the overall length is increased.

Conversely, when the upper limit of the condition (1) is exceeded, aberration correction, particularly, correction of spherical aberration at the telephoto end is difficult. Consequently, it is necessary to increase the overall length or add a lens element. By adopting the three-lens-unit construction to the second lens unit and satisfying the condition (1), compactness is achieved while sufficient optical performance is ensured, and the error sensitivity of the lens elements in the second lens unit can be reduced. Consequently, an image forming device can be realized that has a zoom lens system being easy to manufacture although being small in size and high in performance. The "error sensitivity" referred to here is the error sensitivity of the spherical aberration by the axial thickness of the lens elements and the distance between the lens elements.

It is further preferable to satisfy at least one of the following conditions (1a) and (1b):

$$-0.9 < (CR1-CR2)/(CR1+CR2) < 0.0 \tag{1a}$$

$$-1.0(CR1-CR2)/(CR1+CR2) < -0.05 \tag{1b}$$

The conditions (1a) and (1b) define, of the condition range defined by the condition (1), further preferable condition ranges based on the above-mentioned viewpoint and the like.

By satisfying the condition (1) in each embodiment, an image forming device LU having an easy-to-manufacture zoom lens system TL can be realized by reducing the error sensitivity in the second lens unit GR2 while compactness and high optical performance are ensured in a zoom lens system TL comprising three lens units of negative, positive, positive configuration or two lens units of negative, positive configuration. The use of the image forming device LU according to each embodiment for the digital apparatus CU such as a digital camera or a portable information apparatus contributes to a reduced weight and size, reduced cost, higher performance, higher functionality and the like of the digital apparatus CPU. Conditions for well-balancedly obtaining these effects and achieving higher optical performance and the like will be described below:

It is preferable that at least one positive lens element in the second lens unit satisfy the following condition (2):

$$1.4 < Np < 1.7 \qquad (2)$$

where Np is the refractive index of the positive lens element in the second lens unit.

The condition (2) defines a preferable condition range with respect to the refractive index of the positive lens element included in the second lens unit. When the lower limit of the condition (2) is exceeded, it cannot be helped that curvature is increased for aberration correction. Consequently, it is difficult to manufacture the positive lens element. Conversely, when the upper limit of the condition (2) is exceeded, although curvature can be reduced, dispersion increases. Consequently, correction of chromatic aberration, particularly, axial chromatic aberration at the telephoto end is difficult.

It is preferable that the positive lens element satisfying the condition (2) has at least one aspherical surface. Further, when the effective radius of the aspherical surface is Y and the height in a direction vertical to the optical axis is y, it is preferable that the aspherical surface satisfy the following condition (3) at the height y=Y:

$$-0.01 < PW \cdot (N'-N) \cdot d\{x(y) - x0(y)\}/dy < 0.0 \qquad (3)$$

where
- PW is the optical power (mm$^{-1}$) of the aspherical surface,
- N is the refractive index, to the d-line, of the medium situated on the object side of the aspherical surface,
- N' is the refractive index, to the d-line, of the medium situated on the image side of the aspherical surface,
- x(y) is the surface configuration (the displacement amount in the direction of the optical axis at the height y in the direction vertical to the optical axis, mm) of the aspherical surface, and
- x0(y) is the surface configuration (the displacement amount of a reference spherical surface in the direction of the optical axis at the height y in the direction vertical to the optical axis, mm) of the reference spherical surface corresponding to the aspherical surface.

Here, x(y) representative of the surface configuration of the aspherical surface and x0(y) representative of the surface configuration of the reference spherical surface are expressed, specifically, by the following expressions (as) and (re), respectively:

$$x(y) = \{C0 \cdot y^2\}/\{1 + \sqrt{(1 - \epsilon \cdot C0^2 \cdot y^2)}\} + \Sigma(Aj \cdot y^j) \qquad (as)$$

$$x0(y) = \{C0 \cdot y^2\}/\{1 + \sqrt{(1 - C0 \cdot y^2)}\} \qquad (re)$$

In the expressions (as) and (re), C0 is the curvature (mm$^{-1}$) of the reference spherical surface corresponding to the aspherical surface, $\epsilon$ is the quadric surface parameter, and Aj is the j-th-order aspherical coefficient.

The condition (3) defines a preferable condition range with respect to the aspherical surface configuration. When the lower limit of the condition (3) is exceeded, the optical power of the surface is too weak, so that aberrations (particularly, spherical aberration) are undercorrected. Consequently, the overall length increases. Conversely, when the upper limit of the condition (3) is exceeded, the optical power of the surface increases, so that spherical aberration is overcorrected. Consequently, it is necessary to increase the optical power of another surface or the negative lens element, so that the error sensitivity increases.

It is preferable to satisfy the following condition (4):

$$-2.5 < fl/\sqrt{(fw \cdot ft)} < -0.7 \qquad (4)$$

where fl is the focal length of the first lens unit, fw is the overall focal length of the zoom lens system at the wide angle end, and ft is the overall focal length of the zoom lens system at the telephoto end.

The condition (4) defines a preferable condition range with respect to the focal length of the first lens unit. By satisfying the condition (4), aberrations can be excellently corrected while the overall length is small. Exceeding the upper limit of the condition (4) which means that the optical power of the first lens unit increases is unpreferable for aberration correction although it is preferable for size reduction. In particular, it is unpreferable because the decentering error sensitivity increases. Conversely, exceeding the lower limit of the condition (4) which means that the optical power of the first lens unit decreases is unpreferable for size reduction although it is preferable for aberration correction and error sensitivity.

It is further preferable to satisfy at least one of the following conditions (4a) and (4b):

$$-1.6 < fl/\sqrt{(fw \cdot ft)} < -0.7 \qquad (4a)$$

$$-2.5 < fl/\sqrt{(fw \cdot ft)} < -1.0 \qquad (4b)$$

The conditions (4a) and (4b) define, of the condition range defined by the condition (4), further preferable condition ranges based on the above-mentioned viewpoint and the like.

In the first and second embodiments, in the three-unit zoom construction of negative, positive, positive configuration, the third lens unit GR3 comprises one positive lens element. As described above, by using a lens unit having positive optical power as the third lens unit, telecentricity is easily ensured, and when the third lens unit comprises one lens element, size reduction can be effectively performed. Thus, it is preferable that the zoom lens system comprise three lens units of, from the object side, a first lens unit having negative optical power, a second lens unit having positive optical power and a third lens unit having positive optical power and the third lens unit comprise one positive lens element.

It is preferable to satisfy the following condition (5):

$$1.5 < TLw/fw/Z < 3.5 \qquad (5)$$

where TLw is the optical overall length (the length from the most object side surface of the zoom lens system to the image surface) at the wide angle end, fw is the overall focal length of the zoom lens system at the wide angle end, and Z is the zoom ratio.

The condition (5) defines a preferable condition range with respect to the overall length at the wide angle end. By satisfying the condition (5), aberrations can be excellently corrected while the overall length at the wide angle end is small. When the lower limit of the condition (5) is exceeded, although size reduction is easy because the overall length at the wide angle end is small, aberration correction is difficult. Conversely, when the upper limit of the condition (5) is exceeded, although this is preferable for aberration correction and manufacturing error sensitivity, size reduction is difficult.

It is further preferable to satisfy at least one of the following conditions (5a) and (5b):

$$2.0 < TLw/fw/Z < 3.5 \quad (5a)$$

$$1.5 < TLw/fw/Z < 3.0 \quad (5b)$$

The conditions (5a) and (5b) define, of the condition range defined by the condition (5), further preferable condition ranges based on the above-mentioned viewpoint and the like.

While refractive type lenses that deflect the incident ray by refraction (that is, lenses of a type in which the incident ray is deflected at the interface between media having different refractive indices) are used for the zoom lens system TL constituting each embodiment, the usable lenses are not limited thereto. For example, the following lenses may be used: diffractive type lenses that deflect the incident ray by diffraction, refractive-diffractive hybrid type lenses that deflect the incident ray by a combination of diffraction and refraction, or gradient index type lenses that deflect the incident ray by the distribution of refractive index in the medium. However, since the gradient index type lens whose refractive index changes within the medium increases the cost because of its complicated manufacturing method, it is preferable to use a lens of a homogeneous material having a uniform refractive index distribution. While the diaphragm ST is used as an optical element in addition to the lens elements in the zoom lens system TL constituting each embodiment, a luminous flux restricting plate (for example, a flare cutter) for cutting unnecessary light as required may be disposed as required.

The above-described embodiments and the examples described below include the following structures, and according to the structures, a zoom lens system can be realized that is easy to manufacture although being small in size and high in performance. The use of the zoom lens system as the taking lens system of a digital camera, a portable information apparatus (a mobile telephone, a PDA, etc.) and the like contributes to a reduced weight and size, reduced cost, higher performance, higher functionality and the like of the apparatus.

(Z1) A zoom lens system comprising a plurality of lens units and performing magnification varying by changing the distance between the lens units, wherein at least a first lens unit having negative optical power and a second lens unit having positive optical power are included from the object side, at least the first lens unit and the second lens unit move in zooming from the wide angle end to the telephoto end, the second lens unit comprises three lens elements of, from the object side, a positive meniscus lens element convex to the object side, a negative lens element and a positive lens element, and at least one of the conditions (1), (1a) and (1b) are satisfied.

(Z2) A zoom lens system according to (Z1), wherein at least one positive lens element in the second lens unit satisfies the condition (2).

(Z3) A zoom lens system according to (Z2), wherein the positive lens element satisfying the condition (2) has at least one aspherical surface.

(Z4) A zoom lens system according to (Z3), wherein when the effective radius of the aspherical surface is Y and the height in a direction vertical to the optical axis is y, the aspherical surface satisfies the condition (3) at the height y=Y.

(Z5) A zoom lens system according to one of (Z1) to (Z4), wherein at least one of the conditions (4), (4a), (4b), (5), (5a) and (5b) is satisfied.

(Z6) A zoom lens system according to one of (Z1) to (Z5), comprising three lens units of, from the object side, a first lens unit having negative optical power, a second lens unit having positive optical power and a third lens unit having positive optical power, wherein the third lens unit consists of one positive lens element.

(Z7) A zoom lens system according to one of (Z1) to (Z5), comprising two lens units of, from the object side, a first lens unit having negative optical power and a second lens unit having positive optical power.

(U1) An image forming device comprising: the zoom lens system according to one of (Z1) to (Z7); and an image sensor that converts an optical image formed by the zoom lens system into an electric signal.

(C1) A camera provided with the image forming device according to (U1) and used at least one of still image taking and moving image taking of a subject.

(C2) A camera according to (C1), being a digital camera, a video camera, or a camera incorporated in or externally attached to a mobile telephone, a portable digital assistant, a personal computer, a mobile computer or a peripheral thereof.

(D1) A digital apparatus to which at least one function of still image taking and moving image taking of a subject by being provided with the image forming device according to (U1).

(D2) A digital apparatus according to (D1), being a mobile telephone, a PDA, a personal computer, a mobile computer or a peripheral thereof.

Hereinafter, structures of the zoom lens system used for the above-described image forming device will be further concretely described with reference to construction data and the like. A first to third examples described below are numerical examples corresponding to the above-described first to third embodiments, respectively, and the optical construction views showing the first to third embodiments (FIGS. 1 to 3) show the lens constructions of the corresponding first to third examples, respectively. Table shows values, corresponding to the conditions, of the examples.

In the basic optical constructions (i: surface number), ri (i=1, 2, 3, . . . ) is the radius of curvature (unit: mm) of the i-th surface counted from the object side, di (i=1, 2, 3, . . . ) is the axial distance (unit: mm) between the i-th surface and the (i+1)-th surface counted from the object side, and Ni (i=1, 2, 3, . . . ) and vi (i=1, 2, 3, . . . ) are the refractive index (Nd) and the Abbe number (vd), to the d-line, of the i-th optical element from the object side.

The axial distances di that vary in zooming are variable air distances among the wide angle end (the shortest focal length condition, W), the middle (the middle focal length condition, M) and the telephoto end (the longest focal length condition, T), and f and FNO represent the overall focal lengths (unit: mm) and the f-numbers corresponding to the focal length conditions (W), (M) and (T), respectively.

The surfaces whose data of the radius of curvature ri is marked with * (asterisk) are aspherical surfaces (dioptric surfaces having an aspherical configuration, surfaces having a refractive property equivalent to an aspherical surface, etc.), and are defined by the following expression (AS) expressing the surface configuration of an aspherical surface. Here, the coefficients for the unindicated terms are 0, and for all the data, "E-n=×10$^{-n}$."

$$X(H) = (C0 \cdot H^2)/\{1 + \sqrt{(1 - \epsilon \cdot C0^2 \cdot H^2)}\} + \Sigma(Aj \cdot H^j) \quad (AS)$$

In the expression (AS),

X(H) is the amount of displacement in the direction of the optical axis AX at a height H (with the vertex as the reference), H is the height in a direction vertical to the optical axis AX, C0 is the paraxial curvature (=1/ri), ϵ is the quadric surface parameter, and Aj is the j-th-order aspherical surface coefficient.

Figure 4:
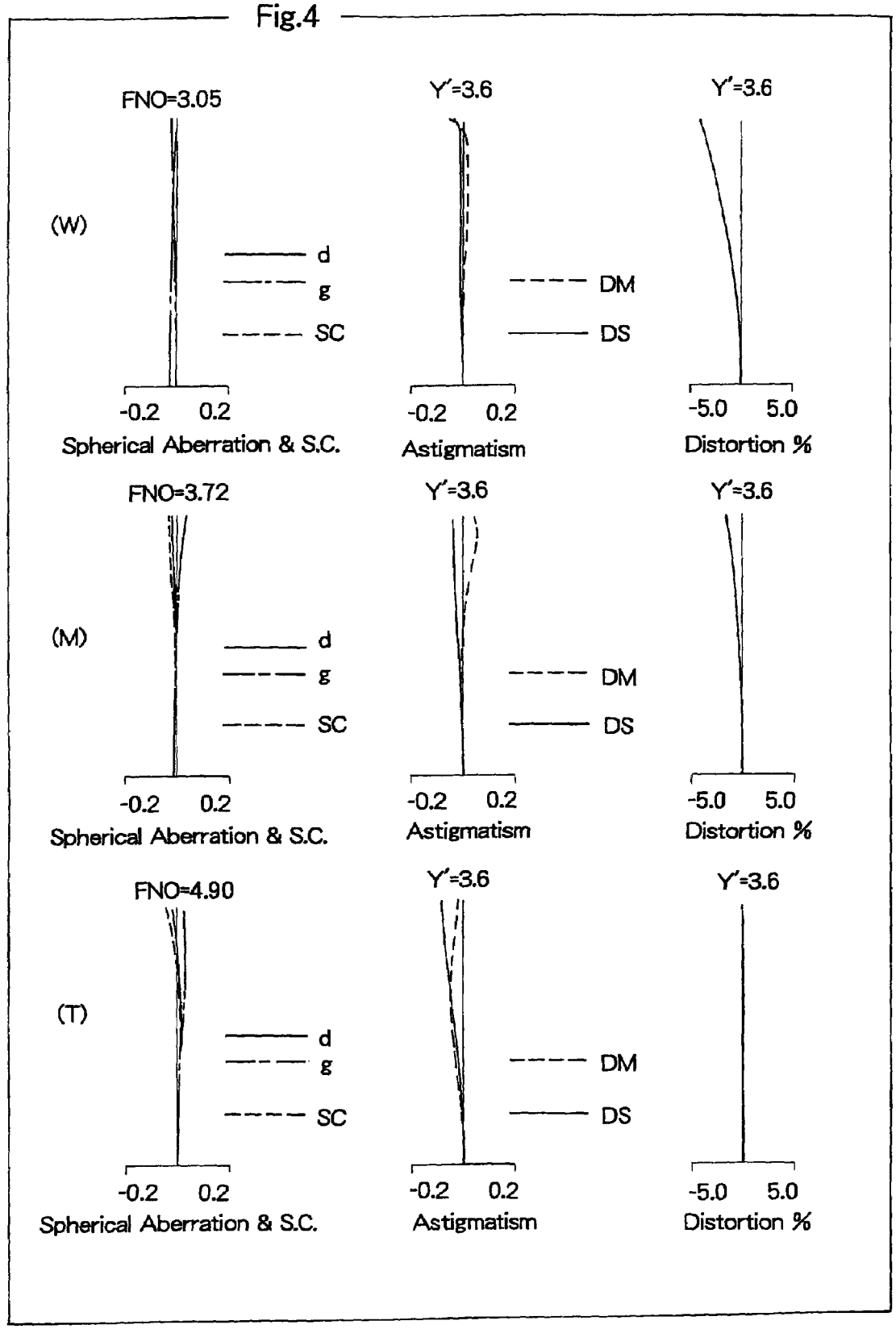
FIG. 4 is graphic representations of aberrations of the first embodiment.
Figure 5:
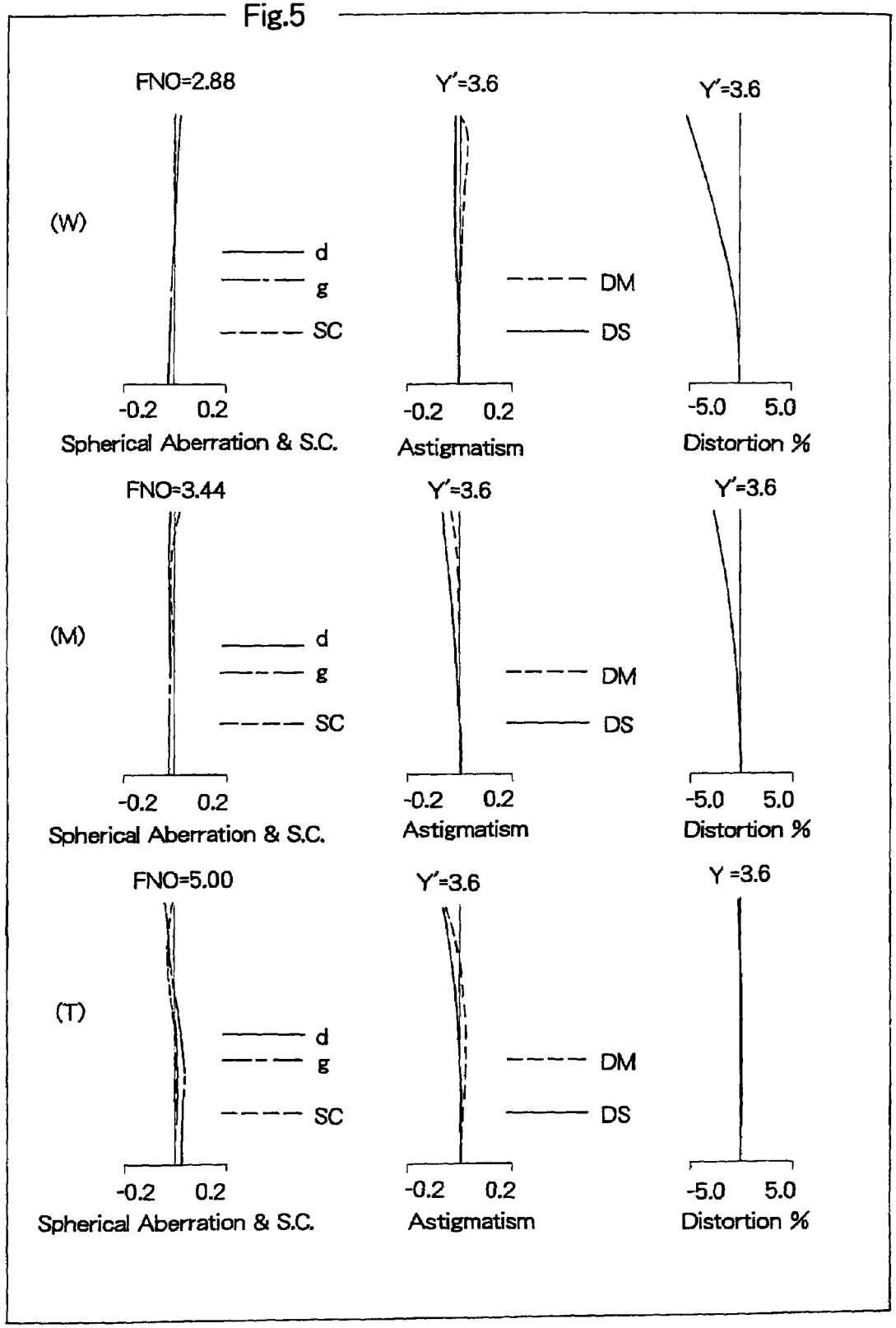
FIG. 5 is graphic representations of aberrations of the second embodiment.
Figure 6:
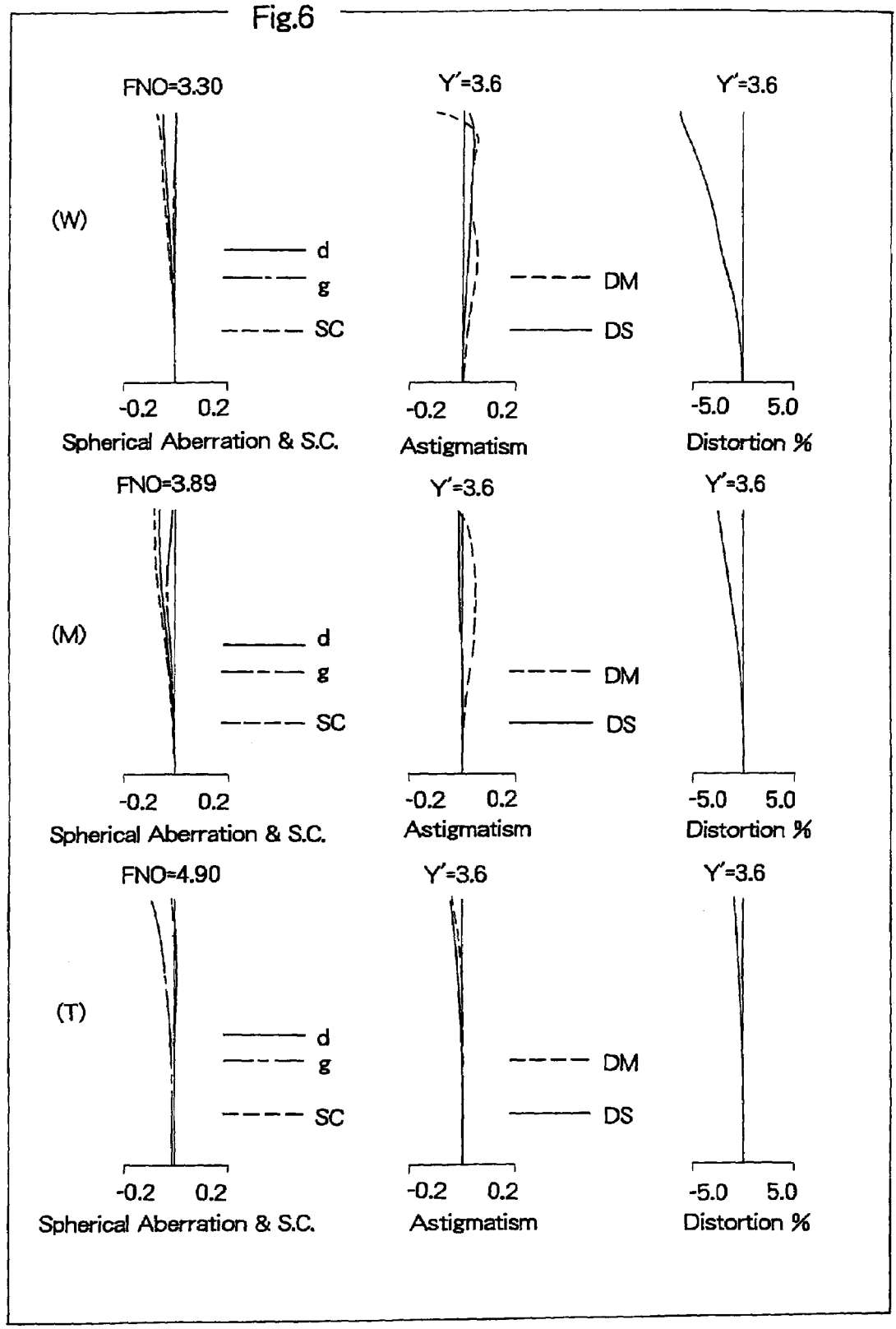
FIG. 6 is graphic representations of aberrations of the third embodiment.

FIGS. 4 to 6 are graphic representations of aberrations corresponding to the first to third examples. (W) show aberrations at wide-angle end in the infinity in-focus state, (M) show aberrations at middle in the infinity in-focus state, and (T) show aberrations at telephoto end in the infinity in-focus state. The left column shows spherical aberrations and sine conditions (S.C.), the middle column shows astigmatisms and right column shows distortions.

FNO represents the f-number, and Y' (mm) represents the maximum image height (corresponding to the distance from the optical axis AX) on the light receiving surface SS of the image sensor SR. In the graphic representations of spherical aberration and sine condition, the solid lines d and the alternate long and short dashed lines g represent the spherical aberration amounts (mm) to the d-line and to the g-line, respectively, and the broken lines SC represent the sine condition dissatisfaction amounts (mm). In the graphic representations of astigmatism, the broken lines DM and the solid lines DS represent the astigmatisms (mm) to the d-line on the meridional surface and on the sagittal surface, respectively. In the graphic representations of distortion, the solid lines represent the distortion (%) to the d-line.

EXAMPLE 1

$f$=5.50–9.29–15.68

$FNO.$=3.05–3.73–4.90

| [Radius of Curvature] | [Axial Distance] | [Refractive Index(Nd)] | [Abbe Number(vd)] |
|---|---|---|---|
| r1 = 80.640 | d1 = 1.000 | N1 = 1.76743 | v1 = 49.48 |
| r2* = 5.300 | d2 = 2.804 | | |
| r3 = 10.767 | d3 = 1.723 | N2 = 1.84666 | v2 = 23.78 |
| r4 = 23.023 | d4 = 16.761–7.087–1.498 | | |
| r5 = INF(ST) | d5 = 1.000 | | |
| r6* = 6.000 | d6 = 3.367 | N3 = 1.53048 | v3 = 55.72 (L21(+)) |
| r7* = 7.652 | d7 = 0.832 | | |
| r8 = 45.902 | d8 = 0.800 | N4 = 1.80518 | v4 = 25.46 (L22(−)) |
| r9 = 8.401 | d9 = 0.005 | N5 = 1.51400 | v5 = 42.83 |
| r10 = 8.401 | d10 = 1.948 | N6 = 1.58913 | v6 = 61.25 (L23(+)) |
| r11 = −8.598 | d11 = 4.079–10.312–20.865 | | |
| r12* = 15.195 | d12 = 1.451 | N7 = 1.53048 | v7 = 55.72 (GR3(+)) |
| r13* = 30.000 | d13 = 7.161–5.987–3.248 | | |
| r14 = INF | d14 = 0.500 | N8 = 1.51680 | v8 = 64.20 |
| r15 = INF | d15 = 0.000 | | |
| r16 = INF | d16 = 0.500 | N9 = 1.51680 | v9 64.20 |
| r17 = INF | | | |

[Aspherical Coefficient]

r2*

ϵ = 0.3020
A4 = −0.64908782E−04
A6 = 0.46698117E−05
A8 = −0.42637540E−06
A10 = 0.14545351E−07
A12 = −0.18588005E−09 r6*

ϵ = 1.0000
A4 = −0.49251260E−03
A6 = −0.82311406E−05
A8 = −0.51450757E−06 r7*

ϵ = 1.0000
A4 = 0.29787285E−03
A6 = −0.86070840E−05
A8 = −0.59337948E−06 r12*

ϵ = 1.0000
A4 = 0.52842825E−03
A6 = −0.12107356E−04
A8 = −0.37289244E−06

-continued r13*

ε = 1.0000
A4 = 0.69778302E−03
A6 = −0.88594967E−05
A8 = −0.76728843E−06

EXAMPLE 2

$f$=5.80–9.53–21.38

$FNO.$=2.88–3.44–5.00

| [Radius of Curvature] | [Axial Distance] | [Refractive Index(Nd)] | [Abbe Number(vd)] |
|---|---|---|---|
| r1 = 67.905 | d1 = 1.000 | N1 = 1.76743 | ν1 = 49.48 |
| r2* = 6.433 | d2 = 3.141 | | |
| r3 = 11.824 | d3 = 1.796 | N2 = 1.84666 | ν2 = 23.78 |
| r4 = 22.284 | d4 = 25.605–12.044–1.680 | | |
| r5 = INF(ST) | d5 = 1.000 | | |
| r6* = 6.093 | d6 = 4.071 | N3 = 1.53048 | ν3 = 55.72 (L21(+)) |
| r7* = 50.000 | d7 = 0.360 | | |
| r8 = 20.955 | d8 = 0.800 | N4 = 1.80518 | ν4 = 25.46 (L22(−)) |
| r9 = 5.916 | d9 = 1.107 | | |
| r10 = 7.246 | d10 = 2.325 | N5 = 1.53048 | ν5 = 55.72 (L23(+)) |
| r11* = −71.675 | d11 = 2.500–5.347–22.792 | | |
| r12* = 22.312 | d12 = 1.447 | N6 = 1.53048 | ν6 = 55.72 (GR3(+)) |
| r13* = 72.018 | d13 = 8.074–9.180–5.470 | | |
| r14 = INF | d14 = 0.500 | N7 = 1.51680 | ν7 = 64.20 |
| r15 = INF | d15 = 0.000 | | |
| r16 = INF | d16 = 0.500 | N8 = 1.51680 | ν8 = 64.20 |
| r17 = INF | | | |

[Aspherical Coefficient]

r2*

ε = 0.2912
A4 = 0.37573117E−04
A6 = 0.62712310E−06
A8 = −0.33626912E−07
A10 = 0.83547899E−09
A12 = −0.81452832E−11 r6*

ε = 1.0000
A4 = −0.38219846E−03
A6 = −0.79507576E−05
A8 = −0.41873850E−06 r7*

ε = 1.0000
A4 = −0.40552524E−03
A6 = −0.18911411E−04
A8 = 0.34838293E−06 r11*

ε = 1.0000
A4 = 0.62163745E−03
A6 = 0.20427617E−04
A8 = −0.83798643E−07 r12*

ε = 1.0000
A4 = −0.13311619E−03
A6 = 0.77951826E−05
A8 = −0.21320862E−06

-continued r13*

ε = 1.0000
A4 = −0.95450693E−04
A6 = 0.46213242E−05
A8 = −0.13961099E−06

EXAMPLE 3

*f*=5.54–9.35–15.79

*FNO.*=3.30–3.89–4.90

| [Radius of Curvature] | [Axial Distance] | [Refractive Index(Nd)] | [Abbe Number(vd)] |
|---|---|---|---|
| r1* = 72.995 | d1 = 1.000 | N1 = 1.76743 | v1 = 49.48 |
| r2* = 5.300 | d2 = 2.832 | | |
| r3 = 9.000 | d3 = 1.737 | N2 = 1.84666 | v2 = 23.78 |
| r4 = 14.852 | d4 = 19.090–8.228–1.791 | | |
| r5 = INF(ST) | d5 = 1.000 | | |
| r6* = 6.000 | d6 = 2.422 | N3 = 1.53048 | v3 = 55.72 (L21(+)) |
| r7* = 20.000 | d7 = 0.574 | | |
| r8 = 49.627 | d8 = 1.200 | N4 = 1.84666 | v4 = 23.78 (L22(−)) |
| r9 = 10.000 | d9 = 1.000 | | |
| r10* = 8.676 | d10 = 1.797 | N5 = 1.48749 | v5 = 70.44 (L23(+)) |
| r11* = −13.433 | d11 = 12.277–16.133–22.644 | | |
| r12 = INF | d12 = 0.500 | N6 = 1.51680 | v6 = 64.20 |
| r13 = INF | d13 = 0.000 | | |
| r14 = INF | d14 = 0.500 | N7 = 1.51680 | v7 = 64.20 |
| r15 = INF | | | |

[Aspherical Coefficient]

r1*

ε = 1.0000
A4 = 0.48597091E−03
A6 = −0.17926702E−04
A8 = 0.29793659E−06
A10 = −0.24929599E−08
A12 = 0.13042277E−10 r2*

ε = 0.7167
A4 = 0.43141973E−03
A6 = −0.16407899E−04
A8 = −0.73786990E−06
A10 = 0.16896544E−07
A12 = −0.10290956E−09 r6*

ε = 1.0000
A4 = −0.49852456E−03
A6 = 0.63781505E−06
A8 = −0.32900976E−05
A10 = −0.20332202E−06
A12 = 0.15824618E−07 r7*

ε = 1.0000
A4 = −0.27120560E−03
A6 = 0.38608122E−05
A8 = −0.78018741E−05
A10 = −0.50413392E−06
A12 = 0.58559737E−07 r10*

ε = 1.0000
A4 = 0.80071779E−03
A6 = 0.40727901E−04
A8 = 0.65174734E−05
A10 = −0.89999954E−06

-continued

A12 = 0.38805654E−07
r11*

ε = 1.0000
A4 = 0.15912591E−02
A6 = 0.60281911E−04
A8 = 0.97926390E−05
A10 = −0.49341625E−06
A12 = 0.34023824E−08

TABLE

|  | <Ex. 1> | <Ex. 2> | <Ex. 3> |
|---|---|---|---|
| Condition 1 |  |  |  |
| (CR1 − CR2)/(CR1 + CR2) | −0.121 | −0.783 | −0.538 |
| Condition 2 |  |  |  |
| Np | 1.530(L21) | 1.530(L21) | 1.530(L21) |
| Condition 3 |  |  |  |
| PW · (N′ − N) · d{x(y) − x0(y)}/dy | −0.002(r6*) | −0.006(r6*) | −0.003(r6*) |
| Condition 4 |  |  |  |
| f1/√(fw · ft) | −1.381 | −1.390 | −1.292 |
| Condition 5 |  |  |  |
| TLw/fw/Z | 2.871 | 2.573 | 2.978 |

The above-described image forming device is an image forming device provided with: a zoom lens system comprising a plurality of lens units and performing magnification varying by changing the distance between the lens units; and an image sensor that converts an optical image formed by the zoom lens system into an electric signal, the zoom lens system comprises at least a first lens unit having negative optical power and a second lens unit having positive optical power from the object side, at least the first lens unit and the second lens unit move in zooming from the wide angle end to the telephoto end, the second lens unit comprises three lens elements of, from the object side, a positive meniscus lens element convex to the object side, a negative lens element and a positive lens element, and the following condition (1) is satisfied:

$$-1.0 < (CR1-CR2)/(CR1+CR2) < 0.0 \quad (1)$$

where CR1 is the front radius of curvature of the most object side lens element in the second lens unit, and CR2 is the rear radius of curvature of the most object side lens element in the second lens unit.

Moreover, in the above-described structure, in the image forming device, at least one positive lens element in the second lens unit satisfies the following condition (2):

$$1.4 < Np < 1.7 \quad (2)$$

where Np is the refractive index of the positive lens element in the second lens unit.

Moreover, in the above-described structures, the image forming device satisfies the following condition (4):

$$-2.5 < f1/\sqrt{(fw \cdot ft)} < -0.7 \quad (4)$$

where f1 is the focal length of the first lens unit, fw is the overall focal length of the zoom lens system at the wide angle end, and ft is the overall focal length of the zoom lens system at the telephoto end.

Moreover, in the above-described structures, in the image forming device, the zoom lens system comprises three lens units of, from the object side, a first lens unit having negative optical power, a second lens unit having positive optical power and a third lens unit having positive optical power, and the third lens unit comprises one positive lens element.

Moreover, in the above-described structures, the image forming device satisfies the following condition (5):

$$1.5 < TLw/fw/Z < 3.5 \quad (5)$$

where TLw is the optical overall length (the length from the most object side surface of the zoom lens system to the image surface) at the wide angle end, fw is the overall focal length of the zoom lens system at the wide angle end, and Z is the zoom ratio.

Moreover, various cameras can be formed by use of the image forming device having the above-described structures.

Although the present invention has been fully described by way of examples with reference to the accompanying drawings, it is to be noted that various in the art. Therefore, unless otherwise such changes and modifications depart from the scope of the present invention, they should be construed as being included therein.

What is claimed is:

1. An image forming device comprising:
a zoom lens system having a plurality of lens units and performing magnification varying by changing the distance between the lens units; and
an image sensor that converts an optical image formed by the zoom lens system into an electric signal,
wherein the zoom lens system comprises at least a first lens unit having negative optical power and a second lens unit having positive optical power from the object side, at least the first lens unit and the second lens unit move in zooming from the wide angle end to the telephoto end, and
wherein the second lens unit comprises three lens elements of, from the object side, a positive meniscus lens element convex to the object side, a negative lens element and a positive lens element, and the following condition (1) is satisfied:

$$-1.0 < (CR1-CR2)/(CR1+CR2) < 0.0 \quad (1)$$

where CR1 is the front radius of curvature of the most object side lens element in the second lens unit, and CR2 is the rear radius of curvature of the most object side lens element in the second lens unit.

2. An image forming device according to claim 1, wherein at least one positive lens element in the second lens unit satisfies the following condition (2):

$$1.4<Np<1.7 \tag{2}$$

where Np is the refractive index of the positive lens element in the second lens unit.

3. An image forming device according to claim 1, wherein the following condition (4) is satisfied:

$$-2.5<fl/\sqrt{(fw \cdot ft)}<-0.7 \tag{4}$$

where fl is the focal length of the first lens unit, fw is the overall focal length of the zoom lens system at the wide angle end, and ft is the overall focal length of the zoom lens system at the telephoto end.

4. An image forming device according to claim 1 further comprising a third lens unit having positive optical power, and the third lens unit consists of one positive lens element.

5. An image forming device according to claim 1, wherein the following condition (5) is satisfied:

$$1.5<TLw/fw/Z<3.5 \tag{5}$$

where TLw is the optical overall length, that is, the length from the most object side surface of the zoom lens system to the image surface at the wide angle end, fw is the overall focal length of the zoom lens system at the wide angle end, and Z is the zoom ratio.

6. A digital camera comprising:

a camera body;

a zoom lens system having a plurality of lens units and performing magnification varying by changing the distance between the lens units; and an image sensor that converts an optical image formed by the zoom lens system into an electric signal, wherein the zoom lens system comprises at least a first lens unit having negative optical power and a second lens unit having positive optical power from the object side, at least the first lens unit and the second lens unit move in zooming from the wide angle end to the telephoto end, and wherein the second lens unit comprises three lens elements of, from the object side, a positive meniscus lens element convex to the object side, a negative lens element and a positive lens element, and the following condition (1) is satisfied:

$$-1.0<(CR1-CR2)/(CR1+CR2)<0.0 \tag{1}$$

where CR1 is the front radius of curvature of the most object side lens element in the second lens unit, and CR2 is the rear radius of curvature of the most object side lens element in the second lens unit.

7. A digital camera according to claim 6, wherein at least one positive lens element in the second lens unit satisfies the following condition (2):

$$1.4<Np<1.7 \tag{2}$$

where Np is the refractive index of the positive lens element in the second lens unit.

8. A digital camera according to claim 6, wherein the following condition (4) is satisfied:

$$-2.5<fl/\sqrt{(fw \cdot ft)}<-0.7 \tag{4}$$

where fl is the focal length of the first lens unit, fw is the overall focal length of the zoom lens system at the wide angle end, and ft is the overall focal length of the zoom lens system at the telephoto end.

9. A digital camera according to claim 6 further comprising a third lens unit having positive optical power, and the third lens unit consists of one positive lens element.

10. A digital camera according to claim 6, wherein the following condition (5) is satisfied:

$$1.5<TLw/fw/Z<3.5 \tag{5}$$

where TLw is the optical overall length, that is, the length from the most object side surface of the zoom lens system to the image surface at the wide angle end, fw is the overall focal length of the zoom lens system at the wide angle end, and Z is the zoom ratio.

* * * * *